W. P. SPOONER.
SHOCKING MACHINE.
APPLICATION FILED MAY 14, 1910.

982,447.

Patented Jan. 24, 1911.
6 SHEETS—SHEET 1.

WITNESSES
J. M. Tapley
G. Thomson

INVENTOR
W. P. Spooner

By _____ Atty

W. P. SPOONER.
SHOCKING MACHINE.
APPLICATION FILED MAY 14, 1910.

982,447.

Patented Jan. 24, 1911.
6 SHEETS—SHEET 3.

WITNESSES
J. M. Tapley
J. Thomson

INVENTOR
W. P. Spooner
By Frank Feluchtenbergh Atty

W. P. SPOONER.
SHOCKING MACHINE.
APPLICATION FILED MAY 14, 1910.
982,447.
Patented Jan. 24, 1911.
6 SHEETS—SHEET 4.
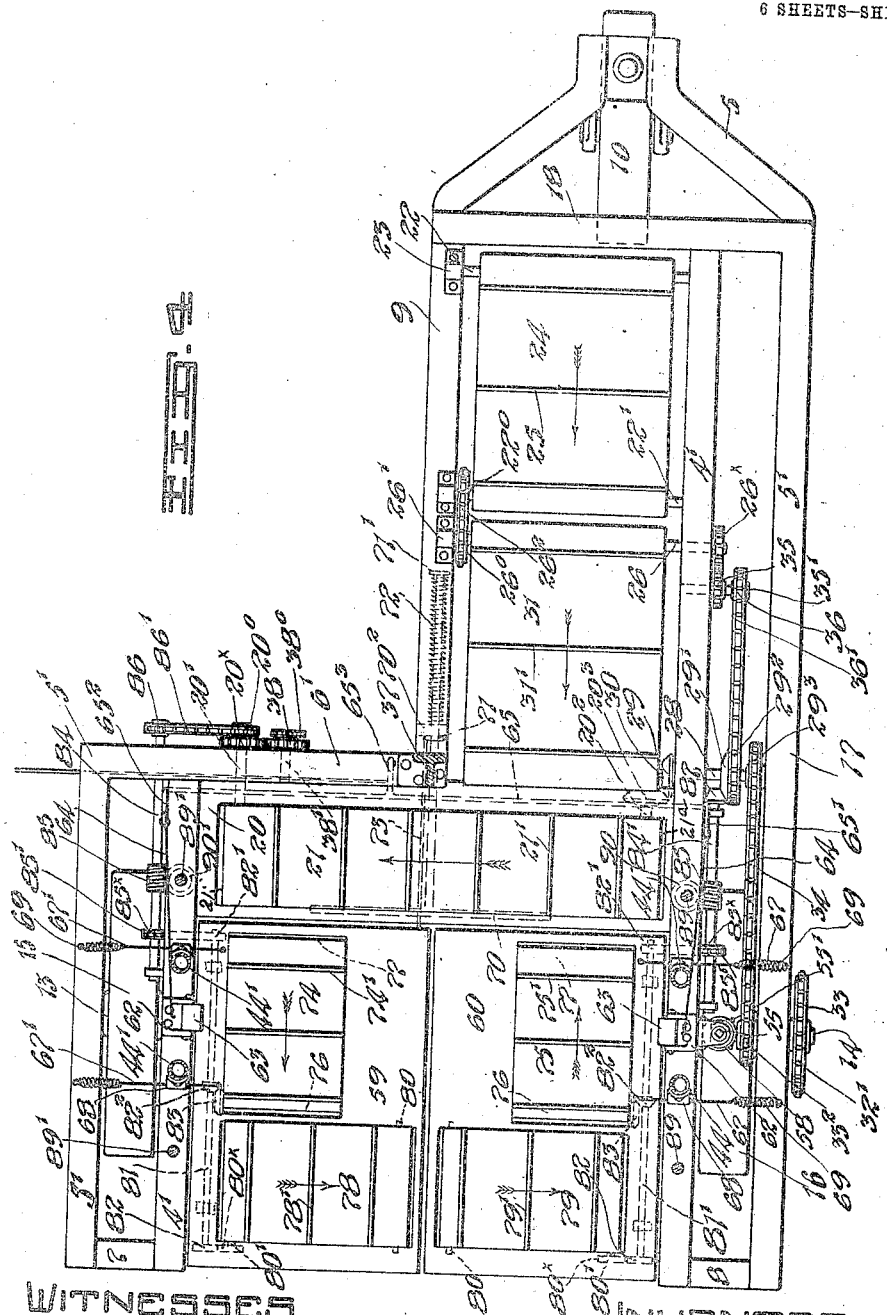
WITNESSES
J. M. Sapley
G. Thomson
INVENTOR
W. P. Spooner
By
Atty

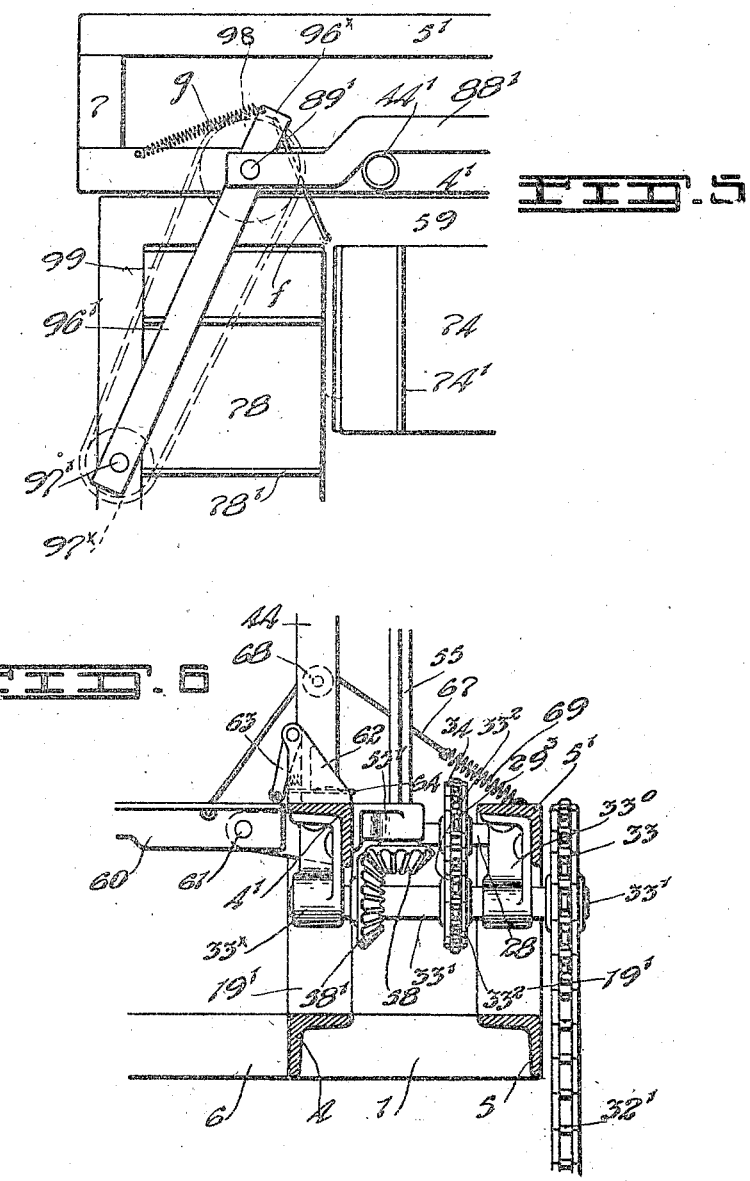

W. P. SPOONER.
SHOCKING MACHINE.
APPLICATION FILED MAY 14, 1910.
982,447.
Patented Jan. 24, 1911.
6 SHEETS—SHEET 6.
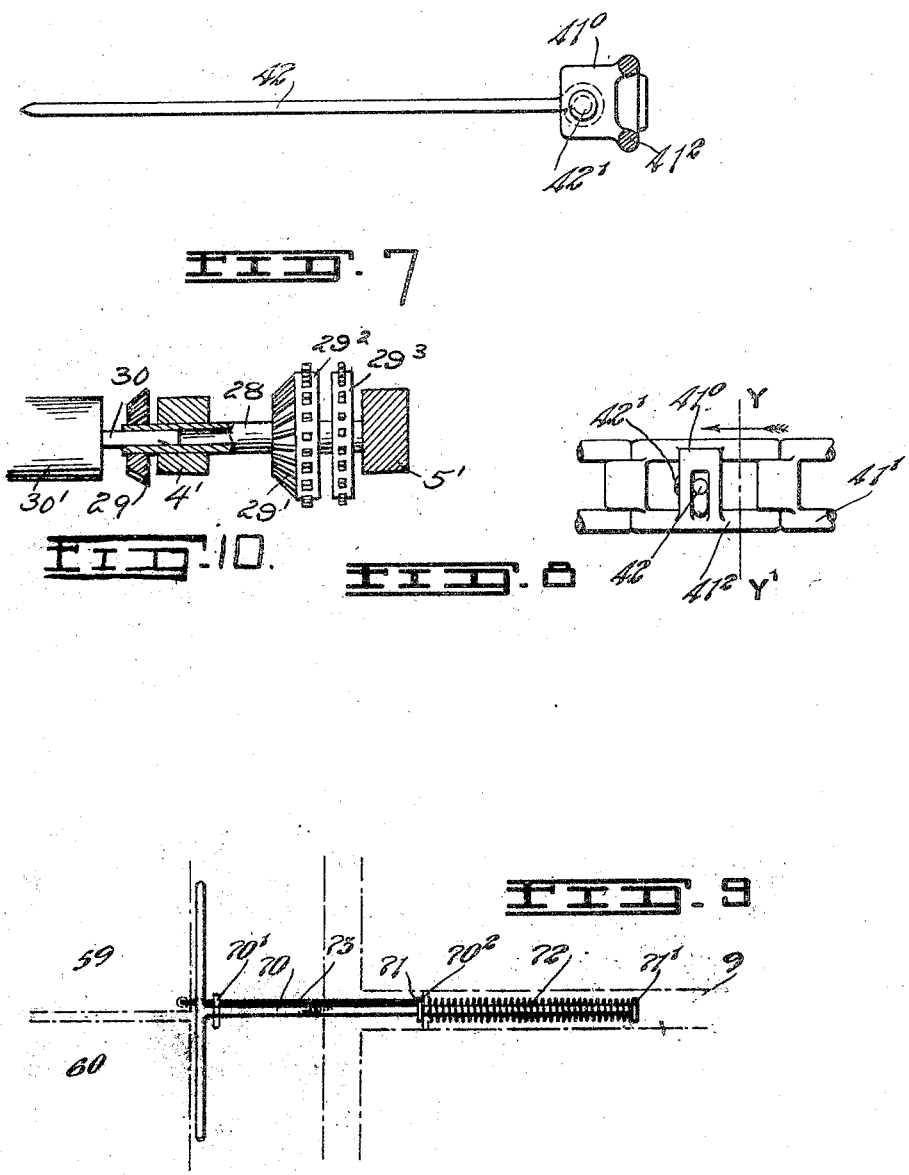
WITNESSES
J. M. Tapley
G. Thomson
INVENTOR
W. P. Spooner
by Fred Falvestenbergh
Atty

UNITED STATES PATENT OFFICE.

WILLIAM PERCY SPOONER, OF CARIEVALE, SASKATCHEWAN, CANADA.

SHOCKING-MACHINE.

982,447.

Specification of Letters Patent. Patented Jan. 24, 1911.

Application filed May 14, 1910. Serial No. 561,399.

*To all whom it may concern:*

Be it known that I, WILLIAM PERCY SPOONER, of the village of Carievale, in the Province of Saskatchewan, Canada, have invented certain new and useful Improvements in Shocking-Machines, of which the following is the specification.

My invention relates to shocking machines and the object of the invention is to provide a machine which can be readily attached to the usual binding machine and be operated therewith, and which will receive the sheaves thrown downwardly from the binder delivery tray, collect them, and deposit them butts down in a shock on the field, the machine being fully under the control of a single operator.

A further object of the invention is to provide a machine of this class which will drop the formed shock a considerable distance to the ground so that the butt is forced well into the usual stubble appearing on the field in which the shocking machine is operating, the butts being primarily spread upon the machine so as to give a good substantial base.

My invention further specifically resides in the following features of construction, arrangement and operation as will hereinafter be set forth, reference being made to the accompanying drawings, in which—

Figure 1:
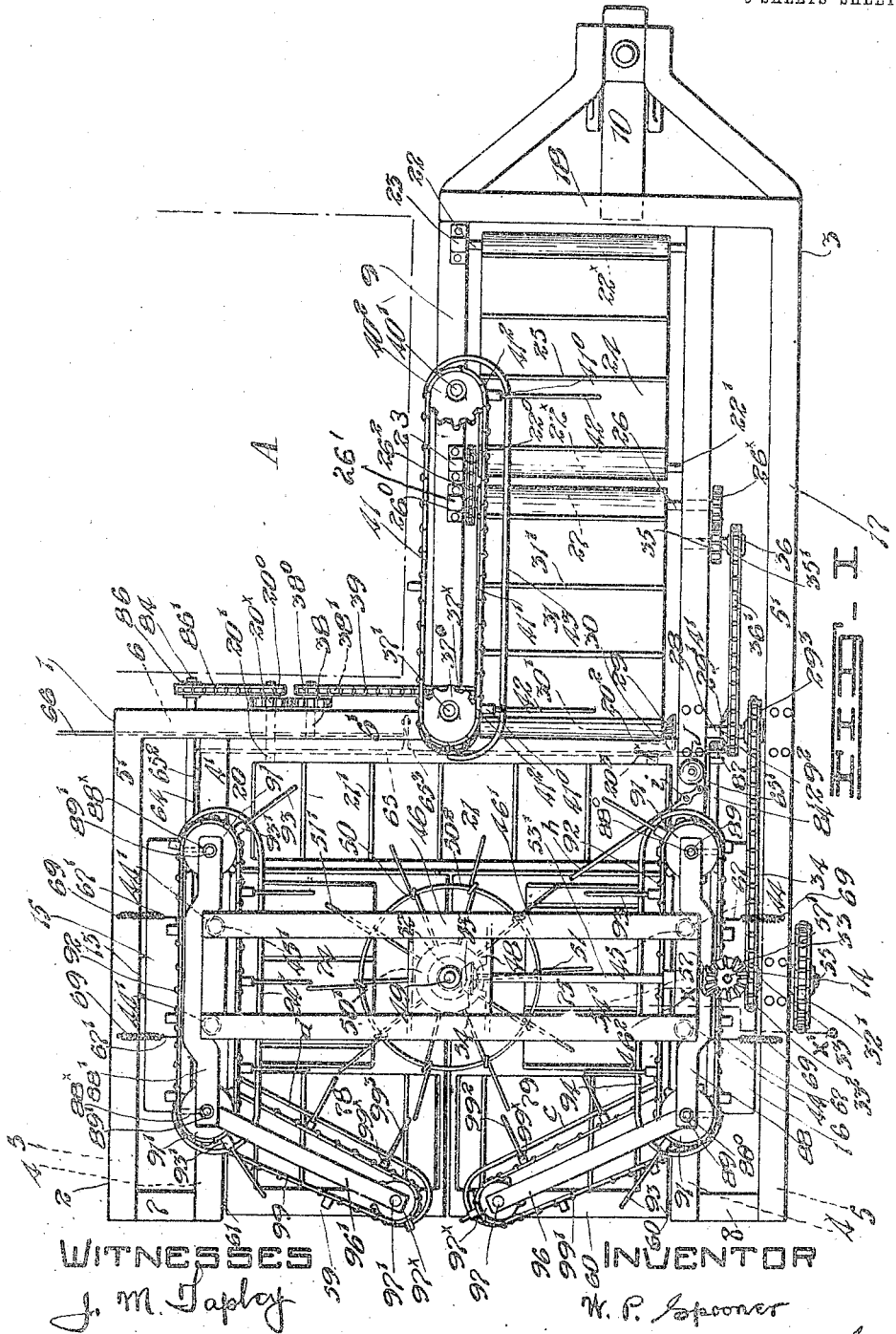
Figure 2:
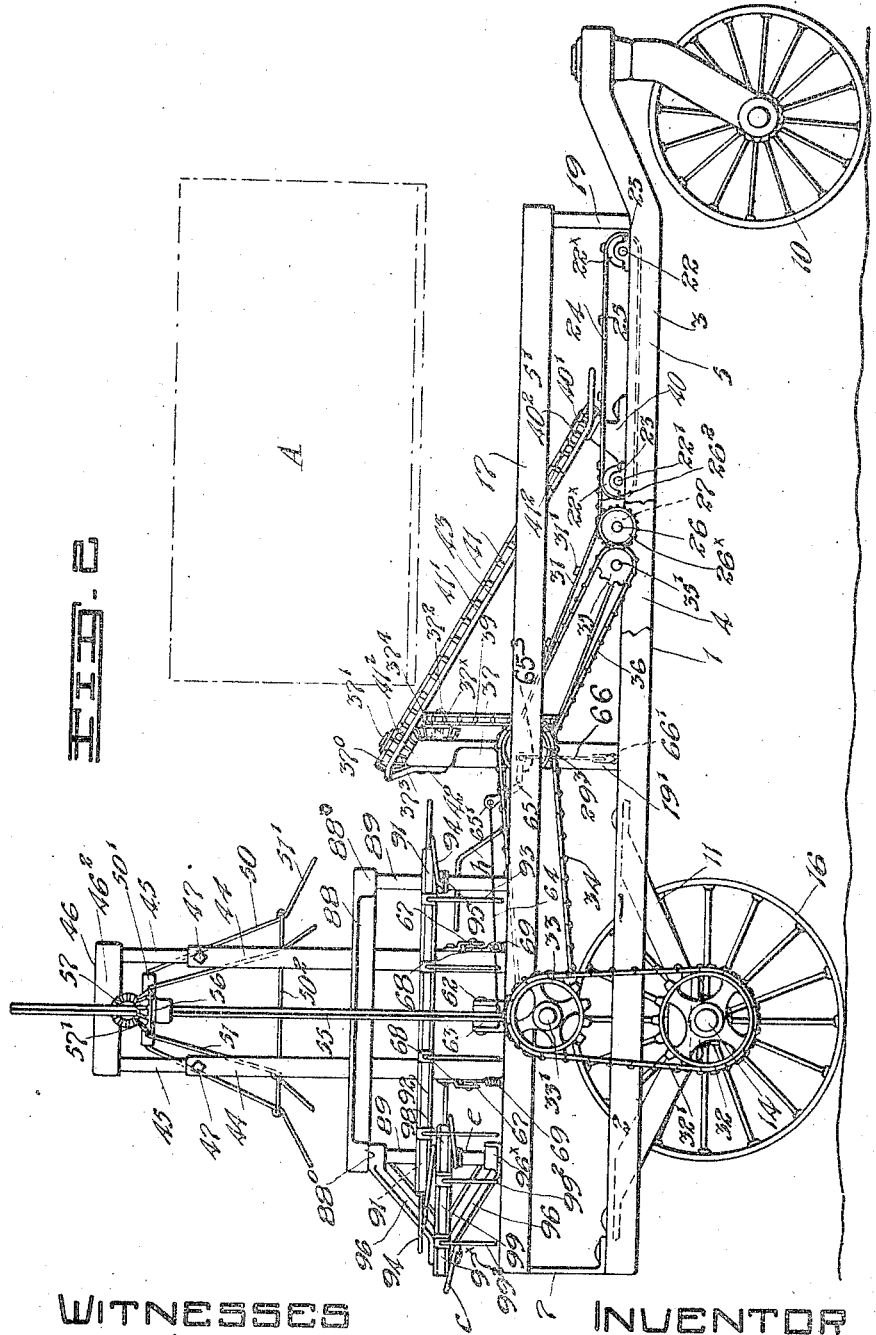
Figure 3:
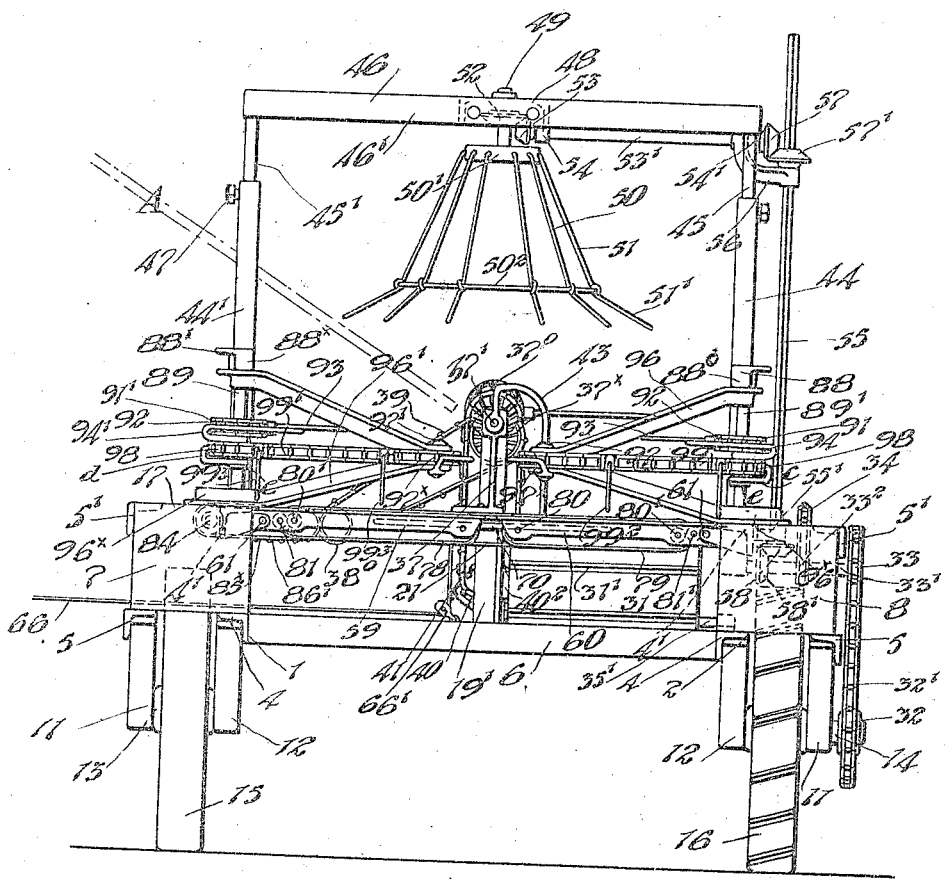

Figure 1 is a plan view of the machine. Fig. 2 is a side elevation of the same. Fig. 3 is a rear end view of the machine. Fig. 4 is a plan view with certain parts removed to expose the belts and conveyers. Fig. 5 is an enlarged detailed plan view of one of the rear corners of the machine. Fig. 6 is an enlarged detailed vertical sectional view through the frame of the machine the section being taken in the plane denoted by the line X X', Fig. 1, and looking toward the right. Fig. 7 is a vertical sectional view through one of the finger carrying chains, the section being taken in the plane denoted by the line Y Y', Fig. 8. Fig. 8 is a side elevation of one of the finger carrying chains showing the manner in which a finger is secured thereto. Fig. 9 is an enlarged detailed plan view of the ejector bar. Fig. 10 is an enlarged detailed vertical sectional view through a portion of the upper frame showing the tubular shaft and adjoining parts.

In the drawings like characters of reference indicate corresponding parts in each figure.

It is to be understood that the shocking machine is secured to the ordinary binding machine by any suitable coupling means and that sheaves are passed to the machine from the binder deck A which is located in respect to the shocking machine so that sheaves are received by one of its conveyers.

The main or under frame 1 of the shocking machine comprises broadly speaking a substantially open sided rectangular rear portion 2 having an extending forward portion 3 the rear portion comprising sets of parallel longitudinally extending beams 4 and 5 on either side of the machine united forwardly by a cross beam 6 and rearwardly by spacing brackets 7 and 8.

One pair of the beams 4 and 5 extends forwardly and forms with the beam 9 the forwardly projecting portion 3 of the frame, said beams 9 and 5 being brought together and supported by a caster wheel 10. Bearing brackets 11 and 12 are secured firmly to the respective pairs of beams 4 and 5 centrally of the rectangular portion 2 of the frame and receive cross shafts 13 and 14 on which are mounted the carriage wheels 15 and 16.

Superimposed above the main frame is an elevated or upper frame 17 practically of the same form as the frame 1 having parts 4', 5', and 6', corresponding to those 4, 5, and 6, and further a cross member 18 forwardly which is supported by corner posts 19. It is to be noted that the upper frame is open above the member 9 as it is above this beam that the sheaves are introduced to the shocking machine from the delivery tray. The brackets 7 and 8 support the rear portion of the elevated frame from the main frame and further posts 19' are interposed between the cross members 6 and 6'. The upper frame has a narrow cross platform 20 constructed thereon which carries suitable bearings for shafts 20' and 20² on which are mounted rollers carrying an endless conveyer 21. The platform is slit at 21ª to allow the conveyer to pass beneath it and said conveyer carries cross slats 21'.

22 and 22' are cross shafts mounted in suitable bearings 23 located on the lower frame. The shafts are supplied with rollers 22ˣ which carry an endless conveyer 24 having cross slats 25 thereon.

26 is a cross shaft mounted in bearings 26' carried by the frame 1, the bearings being arranged so as to place the roller 27 very close to the rear roller 22ˣ. The bearings 26' and 23 for the near side of Figs. 1 and 4 are hidden by the top beam 4'. The upper frame supports a short tubular shaft 28 immediately to the forward side of the platform 20, such shaft being fitted with bevel gears 29 29' and further with chain gears $29^2$ and $29^3$. The shaft $20^2$ is fitted with a bevel gear $20^3$ meshing with the gear 29.

30 is a cross shaft parallel to the shaft 26 such shaft having one end inserted within the tubular shaft 28 within which it is rotatable and the opposite end rotatably mounted in suitable bearings formed in one of the posts 19'. The shaft carries a roller 30' which is connected to the roller 27 by an inclined conveyer 31 having cross slats 31' thereon. The inclined conveyer 31 is continuous with the conveyer 24 and is adapted to carry material deposited thereon directly to the platform 20 and deliver it to the cross conveyer 21.

The shaft 14 is provided with a chain wheel 32 which is connected through a chain 32' with an upper chain wheel 33 carried at the outer end of a shaft 33' mounted in suitable bearings 33" 33ˣ dependent from the upper frame said shaft having a further chain wheel $33^2$ thereon which is connected with the chain wheel $29^3$ through the agency of a chain 34. The shaft 22' is supplied with a chain wheel $22^\circ$ which carries a chain $26^2$ connecting it to a chain wheel $26^\circ$ located on the adjoining end of the shaft 26.

26ˣ is a gear wheel on the opposite end of the shaft 26 said gear wheel meshing with the gear wheel 35 carried by the shaft 35' rotatable in suitable bearings mounted on the frame 1.

36 is a sprocket wheel on the shaft 35' which is united through a chain 36' with the gear wheel $29^2$ already referred to.

37 is a standard secured to the upper frame having extending therefrom stub shafts 37' and $37^2$ which carry intermeshing bevel pinions $37^3$ and $37^4$ also chain wheels $37^\circ$ and $37^\times$.

The shaft 20' hereinbefore referred to is provided with a gear wheel $20^\times$ and a chain wheel $20^\circ$ the gear wheel meshing with a gear wheel 38 located on a shaft 38" carried by the upper frame. The shaft 38' has a chain wheel $38^\circ$ thereon which is connected through a chain 39 with the chain wheel $37^\times$. Immediately at the side of the conveyer 24 and fastened to the main frame is a standard 40 carrying an inclined stub shaft 40' on which is mounted a chain wheel $40^2$ such wheel being connected to the chain wheel $37^\circ$ by a chain 41.

Referring now more particularly to the details of the chain as shown in Figs. 7 and 8 of the drawings it will be seen that it is formed for the most part from regular links 41' and has inserted therein at regular intervals links $41^2$ carrying projecting U-shaped lugs 41" which receive the eyes of the fingers $42$, the fingers being swingably secured in position by pins 42'. The lugs are constructed so that the fingers cannot raise above the horizontal position and so that they will drop when released from a guide bar now to be explained.

43 is a guide bar having one end secured to the stub shaft 40' beneath the chain wheel $40^2$ and the opposite end secured to the standard 37, the body of the bar being inclined and parallel to the chain 41. The fingers 42 are adapted to ride over the guide bar when passing over the conveyers 24, 31, and 21, and to drop to a vertical position when they reach the side opposite the binder deck. It is intended that the guide bar and lugs on the chains be arranged so that the fingers have no vertical play whatever when passing over the guide bar.

44 and 44' are vertically directed similar opposing pairs of tubular members rigidly secured centrally to the members 4' of the upper frame, such tubes receiving similar sets of telescoping rods 45 45' carrying a frame 46 formed from cross and end members 46' and $46^2$, respectively. The frame 46 is what I term the adjustable frame. Suitable adjustable bolts 47 are threaded into the tubes 44 and 44' which engage with the rods 45 and 45' and hold them in any adjusted position.

48 is a plate secured centrally to the adjustable frame and having a bearing for a vertically directed and rotatable shaft 49 which supports a more or less bell-shaped sheaf receiving framework 50 constructed as now described. The framework comprises an upper annular ring 50' secured to the shaft 49 and a lower hoop or wire loop $50^2$ of larger diameter than the ring, the loop being suspended from the ring by downwardly diverging wire rods 51 which have their lower extremities 51' directed outwardly so as to form with the loop individual "rests" for the heads of the sheaves, as will be more clearly apparent hereinafter.

52 is a bevel pinion on the shaft 49 which meshes with a bevel pinion 53 carried by a shaft 53' mounted in suitable bearings 54 and 54' formed in the adjustable frame.

55 is a vertically extending square drive shaft having its lower end rounded and mounted in a bearing 55' secured to one of the members 4' of the upper frame and having its upper end supported by an arm 56 extending from the shaft 53' it being understood that the latter shaft is rotatable in respect to the arm.

57 is a bevel wheel at the outer end of the shaft 53' and 57' is a further bevel wheel slidable on the shaft 55 and having a sleeve extending therefrom and entering a suitable bearing formed in the arm 56. The bevel wheel 57 meshes with that 57'. The lower end of the shaft 55 is supplied with a bevel wheel 58 which meshes with a bevel wheel 58' fixed on the shaft 33', already explained.

59 and 60 are two downwardly swingable platforms pivotally secured to the upper frame at 61, the latter platforms being adapted when up to close the opening appearing immediately behind the cross platform 20. At each side of the upper frame and centrally upon the beams 4' thereof I have placed similar brackets 62 which support swingable spring pressed dogs 63 adapted to overhang the outer edges of the platforms 59 and 60 which it will be noticed (Fig. 6) extend beyond the pivotal points 61. The dogs are prevented from swinging inwardly and upwardly by cables 64 which pass through the brackets and over their polished faces to the upwardly inclined extremities 65' and 65² of a cross rod 65 carried in suitable bearings located on the under side of the platform 20. The rod is fitted with a forwardly projecting arm 65³ to which is fastened a cable 66 which passes through a pulley 66' located on the under frame and then directly to the binding machine where it is attached to a suitable lever within convenient range of the operator. A proper movement of the lever will cause the cable to be withdrawn and the dogs to be swung away from the platform, i. e., toward the brackets, to release the platforms to swing.

Sets of cables 67 and 67' are secured to the platforms and have their extremities extending over pulleys 68 carried by the tubular members 44 and 44' where they are united through springs 69 to the beams 5' of the upper frame. These latter cables return the platforms to their upper or horizontal position as soon as a shock is deposited.

70 is an ejector bar of T-shaped form slidably mounted in a bearing 70' suspended from the under side of the platform 20 and a second bearing 70² located beneath and supported from the beam 9. It is to be understood that the rearward portion of the ejector bar inclines upwardly from the beam 9, which is on the lower frame, to the platform which is carried by the upper frame and that it is supplied with two permanent shoulders 71 and 71' that 71 abutting in the normal position the bearing 70². A spiral spring 72 encircles the shaft and has its ends bearing against the bearing 70² and the shoulder 71'.

73 is a cable secured at one end to the shoulder 71 and at the opposite end to the under side of the platform 59 such cable being beneath the T end of the ejector bar and passing through an eye provided in the bearing 70'. By this construction it will be seen that as soon as the platforms drop the ejector bar is drawn backwardly by the cable 73 so that it follows the shock deposited. The spring 72 returns the bar to the original position when the platforms swing upwardly. Each of the platforms 59 and 60 carry similarly located longitudinally extending conveyers 74 and 75 mounted on suitable rollers rotatable with the supporting cross shafts 76 and 77 carried in bearings provided on the respective platforms. The conveyers are supplied with cross slats 74' and 75', respectively. 78 and 79 are similarly located transversely extending conveyers carried by the platforms 59 and 60 respectively, such conveyers being mounted on suitable rollers carried by longitudinally extending shafts 80 and 80' which are mounted in bearings formed in the platforms. The conveyers are provided with cross slats 78' and 79' respectively. The conveyer 78 receives the material from the conveyer 74 and passes it onto conveyer 79.

81 and 81' are longitudinally extending shafts carried in suitable bearings located on the under sides of the platforms 59 and 60, such shafts being each provided with gear wheels 82, chain wheels 82' and bevel gears 82², the bevel gears meshing with further bevel gears 83 keyed on the respective shafts 76 whereby the conveyers 74 and 75 are rotated. The gear wheels 82 mesh with gear wheels 80ˣ fixed on the ends of the shafts 80' so that the conveyers 78 and 79 are also operated by the shafts 81 and 81'. 84 84' are similar shafts mounted in suitable bearings carried by the upper frame and provided with worm screws 85 and chain wheels 85', respectively, the chain wheels 85' being connected to the respective chain wheels 82' by chains 85ˣ.

86 is a chain wheel on the shaft 84 such wheel being connected through a chain 86' with the chain wheel 20⁰ already referred to. 87 is a bevel pinion on the forward end of the shaft 84' and it meshes with the bevel pinion 29' located on the shaft 28. 88 and 88' are angle iron bars firmly secured to the tubular members 44 44' and above the upper frame such bars having sets of bearings 88⁰ and 88ˣ formed at their ends which receive opposing sets of vertically directed shafts 89 89' having their lower ends mounted in suitable bearings carried by the upper frame. Worm gears 90 and 90' are supplied on the lower ends of the shafts 89 and 89' adjoining the worm wheels 85, such worm gears meshing with the worm wheels. It is to be understood that the above shafts 89 and 89' protrude through the upper frame where they are fitted with the worm gears. Any desired form of cup bearing can be used to support these shafts and allow them to pass through the frame. 91 and 91' are similar sets of chain wheels mounted centrally on the respective sets of shafts 89 and 89' and rotatable therewith. The chain wheels of each set are united by chains 92 which are formed in the same manner as the chain 41 already described, and carry extending fingers 93 passing from lugs 93' extending from certain links of the chain corresponding to the links $41^2$. Guide rods 94 and 94' support the latter fingers in the horizontal position when traveling over the conveyers, said guide rods having their ends turned inwardly to the respective shafts 89 and 89' where they are supported by suitable sleeves
95. The fingers are in these latter cases free to drop to the vertical position as soon as they have passed clear of the conveyers and the upper frame.

96 and 96' are sets of arms swingable on the rear shafts of those 89 and 89', the arms of each set converging and being united by bolts 97 and 97' respectively on which are mounted chain wheels $97^x$. Directly beneath the rear pair of chain wheels 91 and 91' and on the rear pair of shafts 89 and 89' are further chain wheels 98 which are connected respectively to the chain wheels $97^x$ by chains 99 and 99'. The chains 99 and 99' are of the same construction as those 41 and are provided with extending fingers $99^2$ and $99^3$ which pass from lugs $99^x$ similar to those $41^0$ already referred to.

"c" and "d" are guide rods used in conjunction with the fingers $99^2$ and $99^3$ respectively, such rods being supported by the shafts 89 and 89' and the bolts 97 and 97'; it being understood that suitable collars "e" are placed on the shafts. These guide rods are also arranged to support the fingers in the horizontal position when passing over the conveyers and to free them to drop to the vertical position as soon as they are free of the same.

One arm of each pair of arms 96 and 96' extends outwardly beyond the supporting shaft at $96^x$ and is connected by a cable "f" to the adjoining swingable platform. Consequently when the platforms 59 and 60 swing downwardly they open or swing backwardly the sets of arms 96 and 96' thereby allowing the shock deposited to pass from the machine freely. Suitable springs "g" are secured to the ends $96^x$ of the arms and to the upper frame to return the pairs of arms 96 and 96' to their original or closed position.

h is a lever pivotally secured to the upper frame at i and extending inwardly toward the bell-shaped framework where it is adapted to engage with an on coming sheaf carried by the conveyer 75 and in so doing ring a bell or gong j on the frame.

In order to better understand my invention I will now describe its operation assuming the sheaves are delivered over the binder deck A to the conveyer 24 and that the shocking machine and binder are progressing forwardly. The successive sheaves dropped onto the conveyer 24 fall with their heads on one or other of the fingers 42 and their butts on the conveyer. As these parts are moved the sheaf is placed upright with the butts upon the conveyer 31 and the head resting on the finger. From the conveyer 31 each sheaf is passed to the cross conveyer 21 which is moved in the direction indicated by the arrow Fig. 4. As the conveyer proceeds the sheaf is caught by one of the fingers 93 and passed to the conveyer 74, the sheaf then having its head resting on the lower hoop $50^2$ of the bell shaped framework and between the lower extremities 51' of the rods 51. From the conveyer 74 the sheaf passes to the conveyers 78, 79, and 75, respectively, coming under the direct influence of the fingers $99^3$, $99^2$, and 93, the head still resting on the bell shaped framework. It will be understood that if the binder is working properly by the time the first sheaf reaches its limiting position on the conveyer 75 practically all the spaces between the extremities 51' of the adjoining rods are filled with sheaves which have been treated in the same manner as the first sheaf. In other words the bell-shaped framework is filled to its capacity. As the first sheaf reaches the end of the conveyer 75 it engages with the lever h and rings the bell. This is the signal for the operator to pull on the cable 66 which motion turns the rod 65 which controls the further cables 64 attached to the dogs. The instant the dogs are withdrawn from the edges of the platforms 59 and 60 the platforms swing downwardly and deposit the shock on the ground effectually spreading the butts and placing the heads together. The shock is allowed to drop quite a distance so that the butt is forced well into any stubble there may be on the ground. As the shock is deposited the ejector bar is pulled forwardly by a cable 73 and prevents any possibility of the shock falling forwardly when deposited. At the same time the arms 96 and 96' are swung backwardly by the cables f thereby allowing the shock to pass from the machine. The springs 69 return the platforms 59 and 60 to the horizontal position as soon as the shock has passed from the machine and the platforms are again locked in this position by the spring pressed dogs. It will be noticed the bell-shaped framework can be set to any height by adjusting the frame 46. This allows for long or short grain.

What I claim as my invention is:

1. A shocking machine comprising suitable supporting frames, continuous conveyers carried by the frames, movable fingers adjoining the conveyers, and an adjustable and rotatable bell-shaped framework cooperating with the fingers, said parts being arranged to form sheaves into a shock, as and for the purpose specified.

2. A shocking machine comprising suitable frames, a rotatable bell-shaped sheaf receiving framework carried by the frame, conveyers grouped around the framework, conveyers adapted to pass material to the former conveyers, laterally movable fingers adjoining all the conveyers, said parts being arranged to form with the bell-shaped framework a shock, as and for the purpose specified.

3. A shocking machine comprising suitable frames, similar opposing platforms hingedly secured to one of the frames, longitudinally and transversely extending conveyers carried by the respective platforms, a cross conveyer carried by one of the frames and adjoining the longitudinally extending conveyers, continuous conveyers designed to pass material to the latter conveyer, laterally movable supporting fingers adjoining all the conveyers, releasable means for suspending the platforms, and a bell shaped framework located adjacent the conveyers on the platforms adapted to receive the heads of the sheaves, as and for the purpose specified.

4. A shocking machine comprising suitable frames, sets of oppositely disposed conveyers arranged around a central point, a centrally located bell shaped sheaf receiving framework overhanging the conveyers, means for retaining the sheaves in a substantially upright position on the conveyers with their heads resting on the framework, means for depositing the sheaves in the form of a shock on the ground, and means for delivering the sheaves successively to the conveyers, as and for the purpose specified.

5. A shocking machine comprising suitable frames, endless conveyers mounted in one of the frames and grouped around a central point, laterally movable, pivoted, horizontally disposed fingers overhanging the conveyers; a centrally located rotatable bell-shaped sheaf receiving framework overhanging the conveyers, said conveyers, frameworks, and fingers, being adapted to form a shock; means for depositing the shock when formed; and means for delivering sheaves successively to the conveyers, as and for the purpose specified.

6. A shocking machine comprising an upper and a lower frame, a cross conveyer mounted in the upper frame, a set of opposing platforms hingedly secured to the upper frame to the rear of the conveyer, endless cross and longitudinally disposed conveyers carried by the platforms, releasable means for supporting the platforms, laterally movable horizontally disposed fingers adjoining the conveyers, a rotatable bell shaped sheaf receiving framework suspended centrally above the conveyers, and means comprising conveyers adapted to pass sheaves successively to the former conveyers, as and for the purpose specified.

7. A shocking machine comprising an upper and lower frame caster and carriage wheels supporting the same, a cross conveyer carried centrally by the upper frame, a set of similar opposing platforms hingedly secured to the upper frame, releasable means for supporting the platform, cross and longitudinally extending conveyers carried by the platforms, such conveyers being located so that they are continuous with one another and with the cross conveyers carried by the frame, a bell shaped sheaf receiving rotatably mounted framework overhanging the conveyers centrally, such framework forming a rest for the heads of the sheaves and separating them, horizontally disposed endless chains, sprocket wheels for the chains, fingers extending from the chains and adjoining the conveyers, the fingers being horizontally disposed when passing over the conveyers, and means located forwardly on the framework adapted to pass sheaves successively to the central cross conveyer carried by the frame, as and for the purpose specified.

8. A shocking machine comprising an upper and lower frame, caster and carriage wheels therefor, an endless cross conveyer located centrally in the upper frame, a set of similar opposing platforms hingedly secured to the upper frame to the rear of the conveyer, transversely and longitudinally extending continuous conveyers carried by the platforms, the longitudinally extending conveyers being continuous with the aforesaid conveyer carried by the frame, a rotatably mounted bell-shaped sheaf receiving framework suspended above the conveyers centrally, said framework being designed to receive and separate the heads of the sheaves carried by the conveyers, sets of endless chains adjoining the conveyers carried by the platform, fingers passing from the chains and adapted to pass over the platforms when in a horizontally disposed position, adjoining conveyers located forwardly on the frame and adapted to pass sheaves successively to the centrally located cross conveyer, and laterally movable fingers adjoining the forward conveyers, as and for the purpose specified.

9. A shocking machine comprising an upper and lower frame, a forward caster wheel and rearward carriage wheels, a cross conveyer located centrally in the upper frame, a set of similar opposing normally horizontal platforms hingedly secured to the upper frame, such platforms being designed to swing toward each other when closing, releasable means for retaining the platforms in their horizontal positions, transverse and longitudinally extending continuous conveyers carried by the platforms, the longitudinally extending conveyers being continuous with the cross conveyer carried by the frame, an adjustable frame above the upper frame and carried thereby, a rotatably mounted sheaf receiving bell shaped framework carried by the adjustable frame and overhanging the conveyers centrally, said framework being devised to receive and separate the heads of the sheaves, sets of oppositely disposed chain wheels located above the upper frame and adjoining the longitudinally extending conveyers and carrying endless chains, fingers extending from the chains, guide rods adapted to support the fingers and hold them in the horizontal position when passing over the conveyers, a set of rearwardly swingable substantially horizontal arms suspended above the transversely extending conveyers carried by the platform, endless chains swingable with the arms, fingers on said chains, guide rods supporting the fingers above the conveyers in a horizontal position, and means designed to pass sheaves to the centrally located cross conveyer, as and for the purpose specified.

10. A shocking machine comprising an upper and lower frame, a forward caster and rearward carriage wheels, a cross conveyer carried centrally by the upper frame, similar opposing normally horizontal platforms hingedly secured to the upper frame and designed to swing toward each other when closing, releasable means for suspending the platforms in their horizontal position, adjoining transverse and longitudinally extending endless conveyers carried by the platform, the longitudinally extending conveyers being continuous with the cross conveyer hereinbefore referred to, opposing tubular members secured to the upper frame in pairs and to the side of the longitudinally extending conveyers, telescoping rods passing into the tubes and supporting an adjustable frame, a rotatably mounted sheaf receiving bell shaped frame work carried by the frame and overhanging centrally the conveyers, said framework being adapted to receive and separate the heads of the sheaves carried by the conveyers, opposing bars secured to the tubular members, forward and rearward pairs of vertically directed shafts mounted in the upper frame and in the bars respectively, chain wheels fixed on the shafts and united by endless chains, fingers carried by the chains and adapted to extend over the conveyers, guide rods carried by the shafts and supporting the fingers in their horizontal position when passing over the longitudinally directed conveyers, sets of arms swingably secured to the rear vertically directed shafts, sets of chain wheels carried by the arms and by the latter shafts respectively, said chain wheels being fitted with endless chains, fingers extending from the latter chains, guide rods adapted to support the fingers in their horizontal position when passing over the transversely extending conveyers, spring means retaining the arms in a set position above the conveyers, means for swinging the arms rearwardly when the platforms swing downwardly, means for returning the platforms to their original position, and means for delivering sheaves to the centrally located cross conveyer, successively, as and for the purpose specified.

11. A shocking machine comprising an upper and lower frame, caster and carriage wheels for said machine, a centrally located cross conveyer carried by the upper frame normally horizontal, platforms hingedly secured to the upper frame, and being adapted to swing toward each other when closing, releasable means for retaining the platforms in their horizontal positions, transverse and longitudinally extending continuous conveyers carried by the platform, the longitudinally extending conveyers being also continuous with the cross conveyer aforesaid, tubular members extending upwardly from the upper frame immediately to the sides of the platforms, telescoping rods inserted within the tubular members, an adjustable frame carried by the rods, a rotatably mounted shock receiving bell shaped framework carried by the adjustable frame and located centrally above the platforms, such framework being designed to receive and space apart the heads of the sheaves, opposing bars permanently secured to the tubular members, forward and rearward sets of vertically extending shafts mounted in the extremities of the bars and in the frame respectively, chain wheels fixed on the shafts, such chain wheels being provided with endless chains, fingers extending from the chains, guide rods supporting the fingers in a horizontal position when passing over the adjoining conveyers, opposing sets of arms swingably secured to the rear shafts, chain wheels carried by the arms and by the latter shafts, chains connecting the latter chain wheels, fingers extending from the chains, guide rods supporting the fingers in a horizontal position when passing over the adjoining conveyers, all of said fingers being restrained from swinging above the horizontal position, means for swinging the arms backwardly when the platforms swing to deposit a shock, means for returning the platforms to their original position after a shock has been deposited, spring means for returning the arms to their original position after a shock is delivered, and means for delivering sheaves successively to the centrally located cross conveyer, as and for the purpose specified.

12. A shocking machine comprising an upper and lower frame caster and carriage wheels for the machine, a centrally located cross conveyer carried by the upper frame normally horizontal, platforms hingedly secured rearwardly to the upper frame, and being adapted to swing toward each other when closing, releasable means for retaining the platforms in their horizontal position, transverse and longitudinally extending continuous conveyers carried by the platform, the longitudinally extending conveyers being also continuous with the cross conveyer aforesaid, tubular members extending upwardly from the upper frame immediately to the sides of the platforms, telescoping rods inserted within the tubular members, an adjustable frame carried by the rods, a rotatably mounted shock receiving bell shaped framework carried by the adjustable frame and located centrally above the platforms, such framework being designed to receive and space apart the heads of the sheaves, opposing bars permanently secured to the tubular members, forward and rearward sets of vertically extending shafts mounted in the extremities of the bars and in the frame respectively, chain wheels fixed on the shafts, such chain wheels being provided with endless chains, fingers extending from the chains, guide rods supporting the fingers in a horizontal position when passing over the adjoining conveyers, opposing sets of arms swingably secured to the rear shafts, chain wheels carried by the arms and by the latter shafts, chains connecting the latter chain wheels, fingers extending from the chains, guide rods supporting the fingers in a horizontal position when passing over the adjoining conveyers, all of said fingers being restrained from swinging above the horizontal position, means for swinging the arms backwardly when the platforms swing to deposit a shock, means for returning the platforms to their original position after a shock has been deposited, spring means for returning the arms to their original position after a shock is delivered, a set of forward conveyers carried by the lower frame, an inclined conveyer continuous with the forward conveyer and mounted at the forward end on the lower and at the rearward end on the upper frame, such conveyers being adapted to deliver sheaves to the centrally located cross conveyer, suitably mounted chain wheels adjoining the forward and inclined conveyers, endless chains connecting the wheels, pivoted fingers extending at intervals from the chain, and a guide rod supporting the fingers in a horizontal position when passing over the conveyers, as and for the purpose specified.

13. In a shocking machine the combination with a suitable frame, of a set of opposing downwardly swingable platforms adapted to deposit a shock on the ground, and conveyers carried by the platforms, as and for the purpose specified.

14. In a shocking machine the combination with a suitable frame, of a set of opposing downwardly swingable platforms carried by the frame, oppositely disposed conveyers carried by the platforms, and releasable means for retaining the platforms in their horizontal positions, as and for the purpose specified.

15. In a shocking machine the combination with a frame, of a stationary conveyer passing across the frame, downwardly swingable platforms carried by the frame to the rear of the conveyer, oppositely disposed conveyers carried by the platforms, all of said conveyers being continuous the one with the other when the platforms are in the horizontal position, and releasable means for supporting the platforms in such horizontal position, as and for the purpose specified.

16. In a shocking machine the combination with a frame, of a cross conveyer carried by the frame, a set of opposing normally horizontal platforms swingably secured to the frame, oppositely disposed conveyers carried by the platform and continuous with the former conveyer, releasable means for suspending the platforms in their horizontal position, and means comprising laterally movable fingers adapted to pass sheaves from one conveyer to another, as and for the purpose specified.

17. In a shocking machine the combination with a stationary depositing platform, a set of adjoining conveyers adapted to receive sheaves and pass them around a central point on said platform, of a bell adjoining the conveyers, and a lever designed to ring the bell and adapted to engage with the initial shock placed on the conveyers when it is about to pass from the last conveyer to the first after having passed over all of said conveyers, as and for the purpose specified.

18. In a shocking machine the combination with a frame and a set of opposing platforms pivotally secured to the frame, the pivotal points of such platforms being somewhat back from the outer edges thereof, of brackets secured to the frame, swingable spring pressed dogs carried by the brackets and adapted to extend over the adjoining outer edges of the platforms, and means for withdrawing the dogs from engagement with the edges of the platform, as and for the purpose specified.

19. In a shocking machine the combination with an upper and lower frame, the said upper frame carrying a set of downwardly swingable platforms adapted to deposit a shock on the ground, of a T-shaped ejector bar slidably mounted on the frame, a cable uniting the ejector bar to one of the platforms, and a spring adapted to return the ejector bar to its original position when the platforms return to their normal position, as and for the purpose specified.

20. In a shocking machine the combination with an upper frame, a set of opposing platforms hingedly secured thereto, rearwardly swingable arms, endless chains on said arms, fingers on said chains, said arms having each a portion extending beyond the pivotal point thereof, of springs passing between such extending portions and the frame, adapted to swing the arms forwardly over the platforms, and cables secured to such extending portions and to the platforms and adapted to swing the arms rearwardly when the platforms are swung downwardly, as and for the purpose specified.

Signed at Carievale, in the Province of Saskatchewan, this 21st day of Feb., 1910.

WILLIAM PERCY SPOONER.

In the presence of—
T. H. McGREGOR,
S. SHANNON.